(12) United States Patent
Yanase

(10) Patent No.: US 7,579,943 B2
(45) Date of Patent: Aug. 25, 2009

(54) APPARATUS, METHOD AND PROGRAM FOR ALARMING DECREASE IN TIRE AIR-PRESSURE

(75) Inventor: Minao Yanase, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 309 days.

(21) Appl. No.: 11/603,184

(22) Filed: Nov. 22, 2006

(65) Prior Publication Data

US 2007/0139179 A1      Jun. 21, 2007

(30) Foreign Application Priority Data

Dec. 16, 2005   (JP) .............................. 2005-363208
Oct. 5, 2006    (JP) .............................. 2006-274375

(51) Int. Cl.
*B60C 23/00* (2006.01)
(52) U.S. Cl. ...................................... 340/443; 340/442
(58) Field of Classification Search .................. 340/443
See application file for complete search history.

(56) References Cited

U.S. PATENT DOCUMENTS 5,557,552 A * 9/1996 Naito et al. .................. 340/442
6,954,691 B2 * 10/2005 Roll et al. ...................... 701/70

FOREIGN PATENT DOCUMENTS

| CA | 2-363-917 A1 | 5/2002 |
|---|---|---|
| EP | 0-578-826 A1 | 1/1994 |
| EP | 0-783-982 A1 | 7/1997 |
| EP | 0-925-960 A2 | 6/1999 |
| JP | 63-305011 A | 12/1988 |
| JP | 5-221208 A | 8/1993 |
| JP | 2836652 B2 | 10/1998 |
| JP | 11-235908 A | 8/1999 |
| JP | 3095914 B2 | 8/2000 |
| JP | 2002-160512 A | 6/2002 |
| JP | 2003-312222 A | 11/2003 |
| JP | 2004-67009 A | 3/2004 |

OTHER PUBLICATIONS

"Su et al., Tire Pressure Monitoring Technology, Beijing Automotive Engineering, No. 1, pp. 23-25, Feb. 2005."

* cited by examiner

*Primary Examiner*—Davetta W Goins
*Assistant Examiner*—Samuel J Walk
(74) *Attorney, Agent, or Firm*—Birch, Stewart, Kolasch & Birch, LLP

(57) ABSTRACT

To provide an apparatus, method and program for alarming decrease in tire air-pressure which enable to detect decrease in air-pressure of all of four-wheels tires at reduced costs. The apparatus for alarming decrease in tire air-pressure includes means of (1) detecting decrease in tire air-pressure by measuring change of parameter in relation to resonance condition in the tire, and (2) detecting decrease in tire air-pressure by making relative comparison of dynamic loaded radii of tires, wherein the means (1) is included in one to three-wheel tires on a four-wheel vehicle.

3 Claims, 6 Drawing Sheets

(a)

APPARATUS, METHOD AND PROGRAM FOR ALARMING DECREASE IN TIRE AIR-PRESSURE

BACKGROUND OF THE INVENTION

The present invention relates to an apparatus, method and program for alarming decrease in tire air-pressure.

As a method for detecting decrease in tire air-pressure in a four-wheel vehicle such as a passenger car, it is known to directly install a pressure sensor on a wheel, for example. However, such method was not preferable since it costs much.

In Japanese Unexamined Patent Publication No. 305011/1988, it is disclosed a method for detecting decrease in tire air-pressure from wheel velocities of four-wheel tires mounted on a vehicle by utilizing a tire deflation warning system (DWS). The apparatus utilizes a principle that in the case a tire air-pressure is decreased, the dynamic loaded radius of a tire becomes smaller than that of a tire having normal internal pressure, thus the wheel velocity of the deflated tire is faster than that of other tires having normal pressures. However, the apparatus could not detect decrease in tire air-pressure in the case the air-pressures of all of four wheels are decreased.

Other than the above-described methods, it is known to combine the above-mentioned sensor with the apparatus for the purpose of detecting decrease in air-pressures as inexpensively and efficiently as possible. However, such method still costs much.

SUMMARY OF THE INVENTION

An object of the present invention is to provide an apparatus, method and program for alarming decrease in tire air-pressure which enable to detect decrease in air-pressures in all of four-wheel tires at sufficiently reduced costs.

According to an aspect of the present invention, the apparatus for alarming decrease in tire air-pressure includes means of (1) detecting decrease in tire air-pressure by measuring change of parameter in relation to resonance condition in the tire, and (2) detecting decrease in tire air-pressure by making relative comparison of dynamic loaded radius, wherein the means (1) is included in one to three-wheel tires on a four-wheel vehicle.

According to another aspect of the present invention, the method for alarming decrease in tire air-pressure includes steps of (1) detecting decrease in tire air-pressure by measuring change of parameter in relation to resonance condition in the tire, and (2) detecting decrease in tire air-pressure by making relative comparison of dynamic loaded radius, wherein the step (1) is implemented by one to three-wheel tires on a four-wheel vehicle.

According to further another aspect of the present invention, the program for alarming decrease in tire air-pressure makes a computer execute the procedure of (1) detecting decrease in tire air-pressure by measuring change of parameter in relation to resonance condition in the tire, and (2) detecting decrease in tire air-pressure by making relative comparison of dynamic loaded radius, wherein the process (1) is implemented by one to three-wheel tires on a four-wheel vehicle.

According to the present invention, it is possible to provide an apparatus for alarming decrease in tire air-pressure which enables to detect decrease in air-pressures in all of four wheels. According to the present invention, one to three wheels among four-wheel vehicle has/have means for detecting decrease in tire air-pressure in a tire by measuring change of parameter in relation to resonance condition and the remaining tires have means for detecting decrease in tire air-pressure from relative comparison of dynamic loaded radius. By the above-mentioned means, it is possible to provide an apparatus for alarming decrease in tire air-pressure which enables to detect decrease in air-pressures in all of four wheels and to significantly decrease costs, because it does not need to directly use pressure sensors and it requires the minimum progress in computational capacity of a microcomputer and addition of memory.

DETAILED DESCRIPTION

Embodiment

An apparatus for alarming decrease in tire air-pressure according to one Embodiment of the present invention includes means of (1) detecting decrease in tire air-pressure by measuring change of parameter in relation to resonance condition in the tire (means for detecting resonance), and (2) detecting decrease in tire air-pressure by making relative comparison of dynamic loaded radius of tires (means for detecting dynamic loaded radius).

In traveling a surface of a road, tires receive force from small unevenness on the surface of a road to vibrate, and such as torsional moment around an axle of a tire, vertical force, longitudinal force as well as lateral force are generated. Thereby, tires become in resonance condition from the relationship between a spring of each direction and mass (moment of inertia).

The resonance frequency is expressed by $(1/2\pi) \times \sqrt{(k/m)}$ (k: spring constant, m: mass). When air-pressure in a tire decreases, a spring constant in a side wall portion of the tire changes, thereby the resonance frequency changes. In such a manner in the means for detecting resonance, decrease in air-pressure in a tire can be detected by detecting a change of the resonance frequency as change of parameter of the tire in resonance condition.

In the means for detecting resonance, detection of change of parameter is preferably carried out by a means for detecting wheel velocity.

The apparatus for alarming decrease in tire air-pressure according to the present invention detects decrease in air-pressure of four tires on a four-wheel vehicle from wheel velocity rotational information of four tires, FL, FR, RL and RR (hereinafter, referred to as tire T) provided on a four-wheel vehicle and issues alarm to a driver. The apparatus also includes a conventional wheel velocity detecting means 1 provided on respective tires T.

Figure 1:
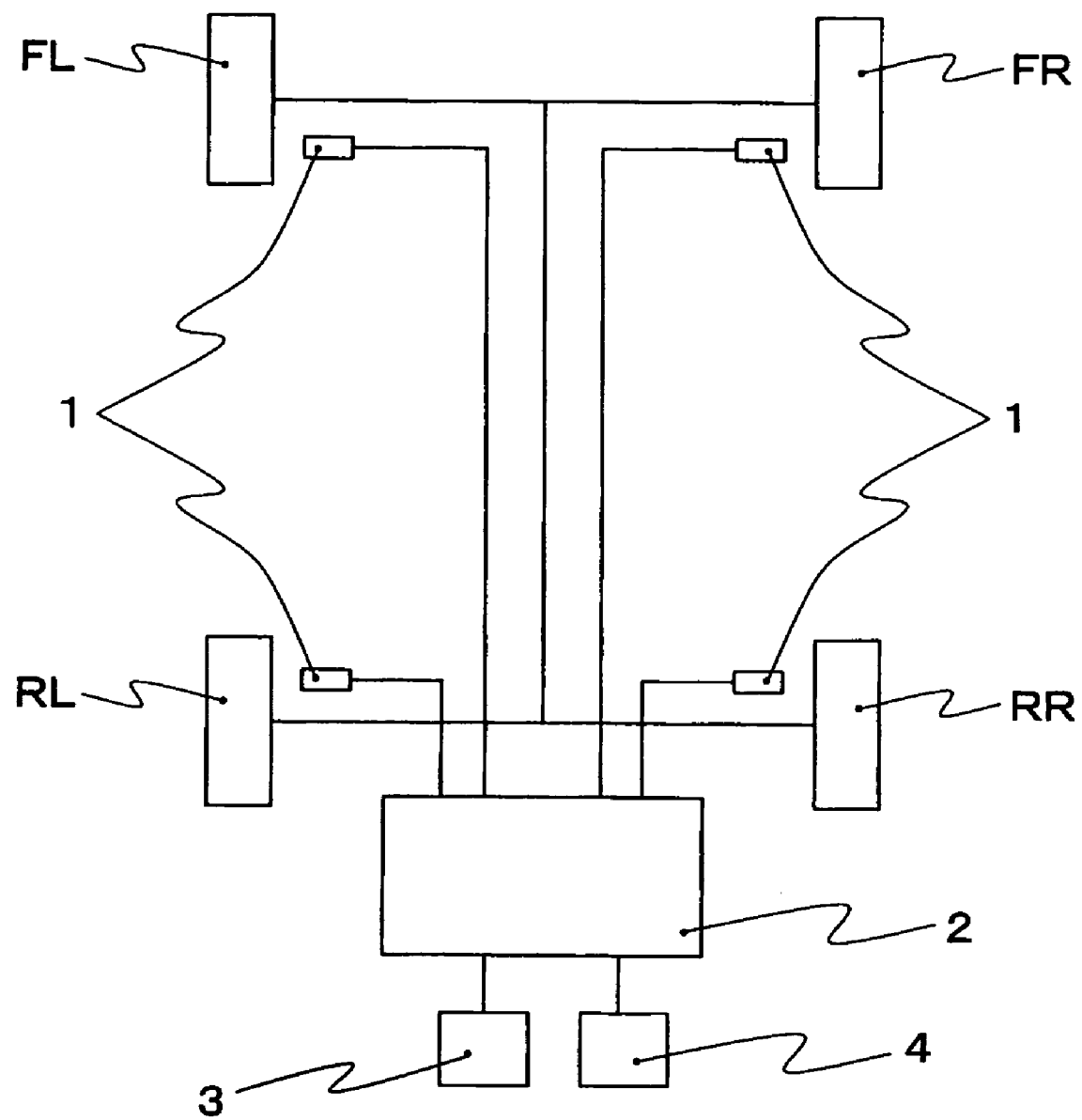
FIG. 1 is a diagram showing one Embodiment according to the apparatus for alarming decrease in tire air-pressure of the present invention.

As for the means for detecting wheel velocity 1, there can be used wheel velocity sensor for measuring wheel velocity rotational information from the numbers of pulses by generating rotational pulses using such as an electromagnetic pickup, or an angular velocity sensor in which power is generated by using rotation such as in a dynamo, wherein the rotational wheel velocity rotational information is measured from this voltage thereof. Outputs of the means for detecting wheel velocity 1 are supplied to a control unit 2 which is a computer such as ABS. As shown in FIG. 1, to the control unit 2, a means for detecting vibration component 3 for analyzing frequencies by extracting resonance frequency from vibration frequency component of a tire and a means for alarming 4 which may be a display device composed of such as a liquid crystal display element, plasma display element or CRT for visually notifying alarm, a sound oscillator for notifying alarm through sound or a device in which a display and sound device are combined, are connected.

Figure 2:
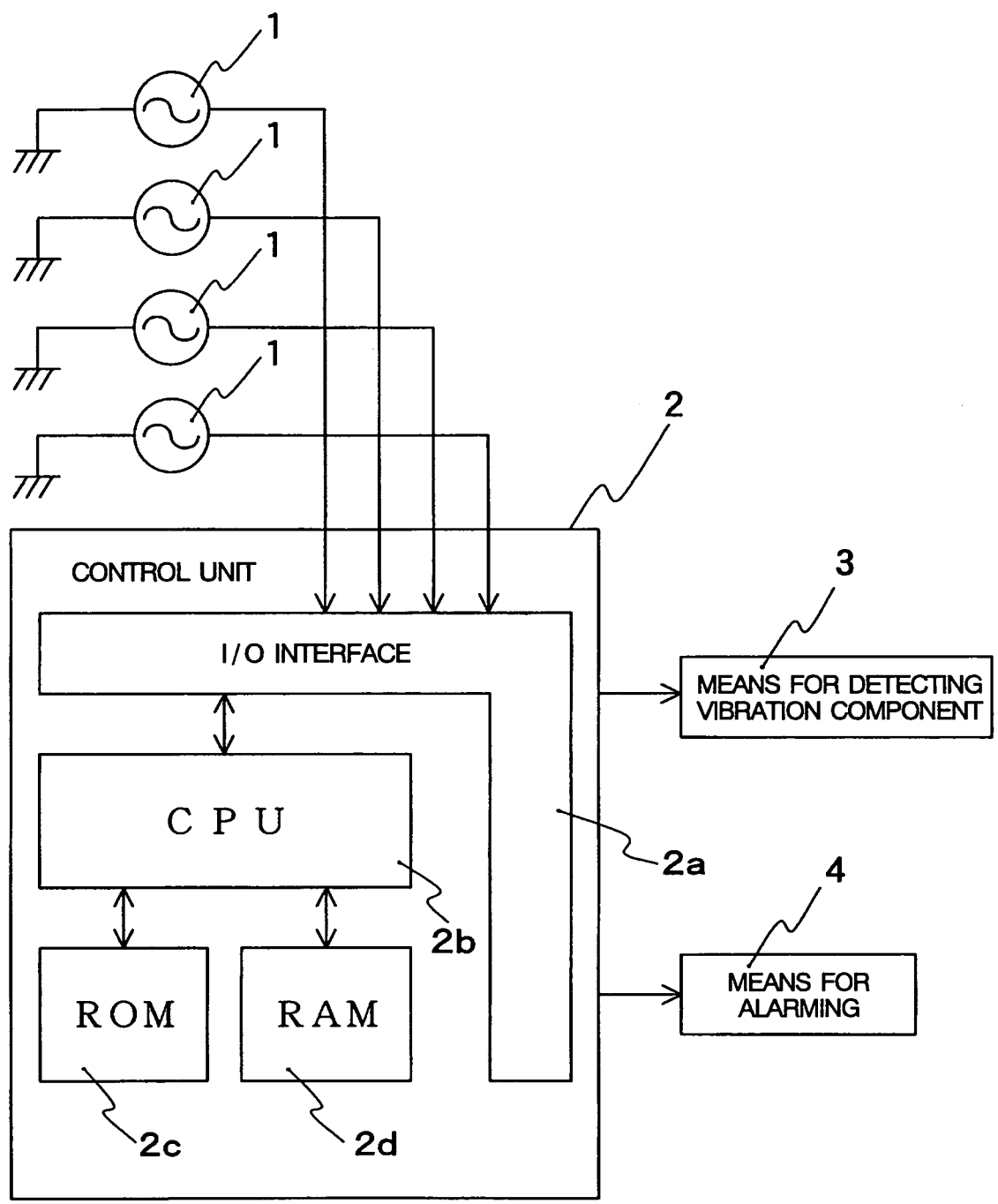
FIG. 2 is a diagram showing an electrical configuration of the apparatus for alarming decrease in tire air-pressure in FIG. 1.

As shown in FIG. 2, the control unit 2 is composed of an I/O interface 2a which is necessary for sending/receiving signals to/from an external device, a CPU 2b which functions as the central of calculation, a ROM 2c in which the control operation program of the CPU 2b is stored, and a RAM 2d in which such as data is temporarily written when the CPU 2b performs control operation and from which written data is readout.

In the means for detecting resonance, pulse signals (hereinafter, referred to as wheel velocity pulses) corresponding to the number of rotations of tires are outputted. Based on the wheel velocity pulses outputted from the means for detecting wheel velocity 1, the rotational angular velocities Fi of respective tires are calculated in the CPU 2b at specified sampling periods $\Delta T$ (sec), for example by every $\Delta T=1$ sec.

Since vibration in the torsion direction (rotational direction) of the tire T with normal air-pressure makes the wheel velocity of the tire change slightly, the vibration can be measured by the means for detecting wheel velocity 1 of ABS. Furthermore, vibration in vertical direction as well as vibration in longitudinal direction also makes the radius of the tire T change slightly to affect the number of revolution of the tire T. Therefore, such vibration can be measured by the means for detecting wheel velocity 1 of ABS.

Specifically, to extract frequency components from waveform signals of a wheel velocity by calculating wheel velocity V for every few m seconds from wheel velocity data obtained from the means for detecting wheel velocity 1 used for ABS, the resonance frequency and power spectrum density are obtained through calculating such as fast Fourier transformation (FFT) and implementing frequency analysis. It should be noted that since frequency components include noise received from a road surface in addition to the resonance frequency of a tire, the frequency components are desirably averaged over a predetermined time period. The FFT calculation results are integrated to determine whether the number of times of integration has reached a predetermined number. In the case the number of times of integration has not reached a predetermined number, wheel velocity is calculated again. On the other hand, in the case the number of times of integration has reached a predetermined number, an averaging process is implemented. The averaging process is carried out to obtain a mean of the FFT calculation result and to decrease fluctuation of the frequency characteristics as much as possible, and a mean of gains of the respective frequency components is calculated. Thereafter, peak search for searching a peak value is carried out. This operation is carried out at the time of normal air-pressure and at the time of initialization detection, and a peak frequency at the time of initialization is stored. At the time of detection, the peak search is carried out in the vicinity of the resonance frequency of a tire. Then the peak frequency is compared with the peak frequency being stored at the time of initialization. In the case the difference of those two frequencies is larger than a predetermined threshold, alarm is issued.

As for a parameter which changes by the resonance condition of a tire, there are parameters such as resonance frequency in the torsion direction, resonance frequency in the vertical direction and resonance frequency in the longitudinal direction. Among those, resonance in the torsion direction is likely to be shown in the ABS wheel velocity sensor and the resonance in the torsion direction does not overlap frequency of unsprung resonance (frequency over 10 Hz) or frequency of vertical vibration (frequency 80 Hz) and the resonance frequency in the torsion direction is also relatively low frequency (low sampling frequency can be applied). From the above-mentioned reason, it is preferable to detect resonance frequency in the torsion direction for a parameter of the means for detecting resonance.

As for a tire on which the means for detecting resonance is provided, a driving wheel is preferable since relatively large and continuous excitation force can be obtained by such as an engine besides excitation from a road surface and detection is easy to be implemented. As for a method for obtaining a parameter in relation to the resonance condition of a tire, a system state estimation theory as typified by the Kalman filter theory may be also applicable.

The means for detecting dynamic loaded radius is a means for detecting decrease in internal pressure from relative difference of wheel velocities of four-wheel tires. The determinate values DEL (1) to DEL (3) are calculated from the following equations:

$$DEL(1)=\{(V1+V4)/2-(V2+V3)/2\}/\{(V1+V2+V3+V4)/4\}\times 100(\%)$$

$$DEL(2)=\{(V1+V2)/2-(V3+V4)/2\}/\{(V1+V2+V3+V4)/4\}\times 100(\%)$$

$$DEL(3)=\{(V1+V3)/2-(V2+V4)/2\}/\{(V1+V2+V3+V4)/4\}\times 100(\%)$$

In the above equations, V1 to V4 represent wheel velocities of a front left tire (FL tire), front right tire (FR tire), rear left tire (RL tire) and rear right tire (RR tire), respectively. The means for detecting dynamic loaded radius notifies decrease in air-pressure in a tire to a driver in the case any one of determinate values DEL (1) to DEL (3) are larger than a predetermined threshold.

For example, DEL (1) to DEL (3) are all positive when air-pressure of only the FL tire is decreased, DEL (1) and DEL (3) are negative and DEL (2) is positive when air-pressure of only the FR tire is decreased, DEL (1) and DEL (2) are negative and DEL (3) is positive when air-pressure of only the RL tire is decreased, and DEL (1) is positive and DEL (2) and DEL (3) are negative when air-pressure of only the RR tire is decreased.

In the case air-pressure of the FL and FR tires are decreased, DEL (2) is positive and becomes larger than the threshold.

Furthermore, in the case air-pressure of the FR, RL and RR tires are decreased, DEL (1) to DEL (3) are all negative.

In the means for detecting dynamic loaded radius, a pulse signal (hereinafter referred to as wheel velocity pulse) which corresponds to the number of revolutions of the FL, FR, RL and RR tires (hereinafter correctively referred to as Wi, wherein i=1 to 4, 1: FL tire, 2: FR tire, 3: RL tire and 4: RR tire) is outputted. In FIG. 1, rotational angular velocities Fi of respective tires are calculated by a predetermined sampling periods ΔT (sec), for example ΔT=1 second, on the basis of the wheel velocity pulses which are outputted from the means for detecting wheel velocity 1.

Since tires Wi are manufactured by including variations within a specification (initial difference), effective rotational radii of respective tires Wi (value obtained through dividing a distance being advanced with one revolution by $2\pi$) are not necessarily identical to one another even when internal pressures of all tires Wi are normal. The rotational angular velocities Fi of respective tires Wi thus vary. Therefore, the corrected rotational angular velocities F1$i$ are calculated to cancel the variations due to the initial difference. Specifically, the value is corrected as follows:

F11=F1

F12=mF2

F13=F3

F14=nF4

The correction coefficients m, n are obtained by calculating the rotational angular velocity Fi under a condition when a vehicle is traveling straight, for example, and by calculating m=F1/F2 and n=F3/F4 based on the calculated rotational angular velocity Fi. On the basis of the F1$i$, wheel velocities Vi of tires on respective wheels are calculated, and the obtained values are substituted in the equations for obtaining DEL (1) to DEL (3).

The means for detecting dynamic loaded radius can determine respective wheel velocities of four-wheel tires used for controlling ABS through relative comparison thereof. In other words, the means detects decrease in internal pressure of respective wheels by comparing relative velocities thereof without using absolute velocity. Therefore, it is not possible to detect simultaneous decrease in tire air-pressure of four wheels in which four wheels are simultaneously changed in the same way. Therefore, it is essential to provide the means for detecting resonance along with the means for detecting dynamic loaded radius.

In the present invention, one or more wheel(s) among four wheels has/have the means for detecting resonance. In the case the means for detecting resonance is not provided, because detection is implemented by only the means for detecting dynamic loaded radius, decrease in air-pressures in all of four-wheel tires cannot be detected. The means for detecting resonance is provided on three wheels or less among four wheels, and preferably provided on two wheels or less. When the means for detecting resonance is provided on all of four-wheel tires, high computational capacity and large memory capacity are required, and to result in high cost.

One Embodiment of the present invention relates to a method for alarming decrease in tire air-pressure including steps of (1) detecting decrease in tire air-pressure by measuring change of parameter in relation to resonance condition of the tire (step for detecting resonance), and (2) detecting decrease in tire air pressure by making relative comparison of dynamic loaded radii of tires (step for detecting dynamic loaded radius). The step of resonance detection and the step of detecting dynamic loaded radius can be implemented in the same manner as implemented in the means for detecting resonance and the means for detecting dynamic loaded radius included in the apparatus for alarming decrease in tire air-pressure of the present invention.

One Embodiment of the present invention relates to a program for alarming decrease in tire air-pressure, making a computer execute the procedure of (1) detecting decrease in tire air-pressure by measuring change of parameter in relation to resonance condition of the tire (procedure of resonance detecting), and (2) detecting decrease in tire air-pressure by making relative comparison of dynamic loaded radii of tires (procedure of dynamic loaded radius detecting). The procedure of resonance detection and the procedure of dynamic loaded radius detection can be implemented in the same manner as implemented in the means for detecting resonance and the means for detecting dynamic loaded radius included in the apparatus for alarming decrease in tire air-pressure of the present invention.

EXAMPLE

The present invention is explained in detail on the basis of Examples. However, the present invention is not limited to such Examples.

The conditions of a driving test for confirming the performance of the method for alarming decrease in tire air-pressure of the present invention is shown in conjunction with the test course.

(Experimental Condition)

Type of a test vehicle: Toyota Corolla Fielder (front-wheel drive)

Experiment location: Sumitomo Rubber Industries, Okayama testing course and neighboring local roads Types of tires: 185/70 R14

Standard internal pressure: 200 kPa (front wheels), 200 kPa (rear wheels)

Initial values of dynamic loaded radius: front wheels 296.7 mm, rear wheels 298.1 mm Traveling velocity: 40 km/h (Driving Test)

Driving tests were carried out under conditions (1) to (4), in which (1) an air-pressure of one-wheel tire is decreased, (2) an air-pressure of two-wheel tires are decreased, (3) an air-pressure of three-wheel tires are decreased and (4) air pressures of all of four-wheel tires are decreased to examine whether decrease in air-pressure is detected either by the means for detecting resonance or means for detecting dynamic loaded radius. The values of the internal pressures and dynamic loaded radii of tires with decreased pressure were 150 kPa and 295.9 mm for front wheels and 150 kPa and 296.8 mm for rear wheels.

(Test Result)

FIGS. 3 to 6 show a deflation detecting method for detecting decrease in air-pressure in the case the means for detecting resonance was applied to only the FL tire and means for detecting dynamic loaded radius were applied to the remaining tires. The test vehicle was a front-wheel drive vehicle and the FL tire was a driving wheel.

(1) Deflation in One-Wheel Tire

Figure 3:
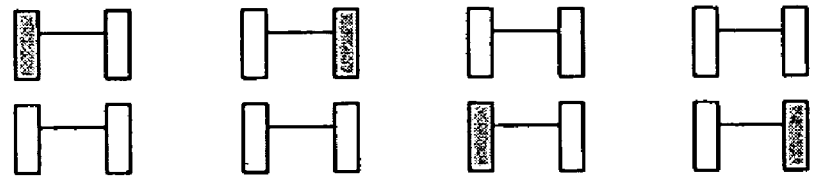
FIG. 3 is a diagram showing methods for detecting decrease in air-pressure when a tire air-pressure of one wheel among four wheels is decreased.
Figure 4:
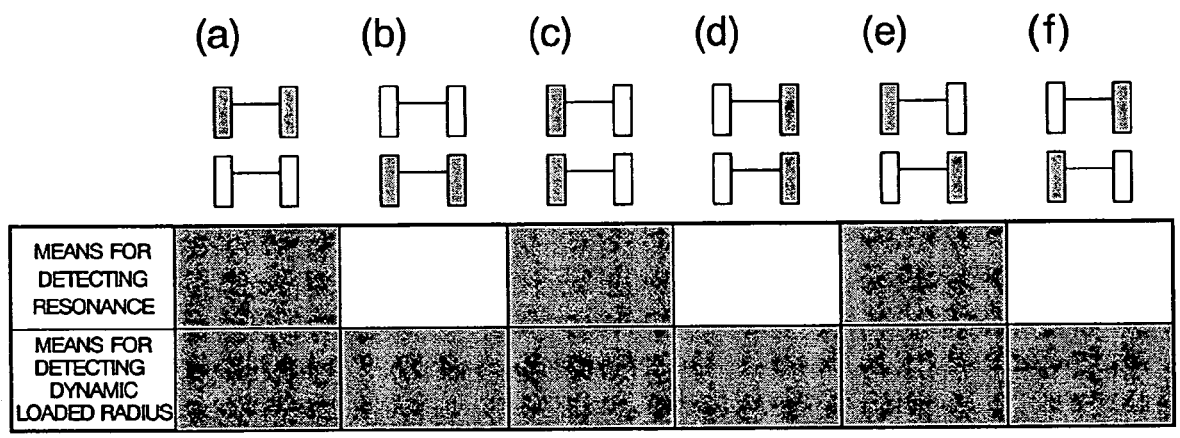
FIG. 4 is a diagram showing methods for detecting decrease in air-pressure when tire air-pressures of two wheels among four wheels are decreased.
Figure 5:
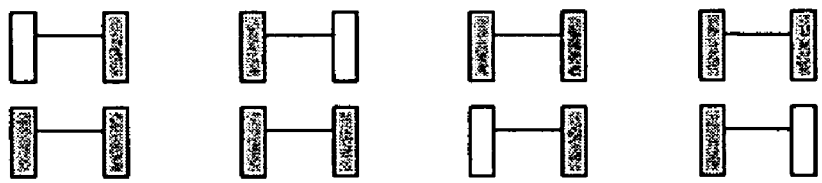
FIG. 5 is a diagram showing methods for detecting decrease in air-pressure when tire air-pressure of three wheels among four wheels are decreased.
Figure 6:
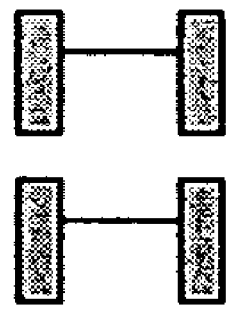
FIG. 6 is a diagram showing methods for detecting decrease in air-pressure when tire air-pressures of all of four wheels are decreased.

In the case decrease in air-pressure in (a) only FL tire, decrease in air-pressure can be detected by the means for detecting resonance and means for detecting dynamic loaded radius (see FIG. 3(*a*)).

On the other hand, in the case the FR tire, RL tire and RR tire are respectively deflated, decrease in air-pressure can be detected by the means for detecting dynamic loaded radius (see FIGS. 3(*b*) to 3(*d*)).

(2) Deflation in Two-Wheel Tires

In the case two-wheel tires including the FL tire such as the case of deflation in (a) FL and FR tires, (c) FL and RL tires or (e) FL and RR tires, decrease in air-pressure can be detected by the means for detecting resonance and means for detecting dynamic loaded radius (see FIGS. 4(a), 4(c) and 4(e)).

On the other hand, in the case two-wheel tires including other than the FL tire such as the case of deflation in (b) RL and RR tires, (d) FR and RR tires or (f) FR and RL tires, decrease in air-pressure can be detected by the means for detecting dynamic loaded radius (see FIGS. 4(b), 4(d) and 4(f)).

(3) Deflation in Three-Wheel Tires

In the case three-wheel tires including the FL tire such as the case of deflation in (b) FL, RL and RR tires, (c) FL, FR and RR tires or (d) FL, FR and RL tires, decrease in air-presure can be detected by the means for detecting resonance and means for detecting dynamic loaded radius (see FIGS. 5(b), 5(c) and 5(d)).

On the other hand, in the case three-wheel tires including other than the FL tire such as the case of decrease in (a) FR, RL and RR tires, decrease in air-pressure can be detected by the means for detecting dynamic loaded radius (see FIG. 5(a)).

(4) Deflation in Four-Wheels Tires

In the case all of four-wheels tires including the FL tire such as the case of deflation in (a) FL, FR, RL and RR tires, decrease in air-pressure can be detected by the means for detecting resonance (see FIG. 6(a)).

What is claimed is:

1. An apparatus for alarming decrease of tire air pressure, comprising
    first means for detecting decrease of tire air pressure by measuring a change of a parameter in relation to a resonance condition in a tire; and
    second means for detecting decrease of tire air pressure by making a relative comparison of dynamic loaded radii of tires;
    wherein the first means is included in one, two or three tires of a four-wheel vehicle, and
    wherein the first means and the second means are used for detecting simultaneous deflation of four tires of the four-wheel vehicle together.

2. A method for alarming decrease in tire air pressure, comprising the steps of:
    (1) detecting decrease of tire air pressure by measuring a change of a parameter in relation to a resonance condition in a tire; and
    (2) detecting decrease of tire air pressure by making a relative comparison of dynamic loaded radii of tires;
    wherein the step (1) is performed in one, two or three tires of a four-wheel vehicle, and
    wherein the steps (1) and (2) are used for detecting simultaneous deflation of four tires of the four-wheel vehicle together.

3. A computer program product for alarming decrease in tire air pressure, the computer program product being embodied on a computer readable medium, the computer program product comprising computer-executable instructions of
    (1) detecting decrease of tire air pressure by measuring a change of a parameter in relation to a resonance condition in a tire; and
    (2) detecting decrease of tire air pressure by making a relative comparison of dynamic loaded radii of tires;
    wherein the computer-executable instruction (1) is performed in one, two or three tires of a four-wheel vehicle, and
    wherein the computer-executable instructions (1) and (2) are used for detecting simultaneous deflation of four tires of the four-wheel vehicle together.

* * * * *